United States Patent
Haruna

(10) Patent No.: US 10,511,779 B1
(45) Date of Patent: Dec. 17, 2019

(54) IMAGE CAPTURING APPARATUS, METHOD OF CONTROLLING SAME, AND STORAGE MEDIUM

(71) Applicant: CANON KABUSHIKI KAISHA, Tokyo (JP)

(72) Inventor: Kohta Haruna, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/425,322

(22) Filed: May 29, 2019

(30) Foreign Application Priority Data

Jun. 19, 2018 (JP) ................................ 2018-116381

(51) Int. Cl.
*H04N 5/232* (2006.01)

(52) U.S. Cl.
CPC ..... *H04N 5/23293* (2013.01); *H04N 5/23245* (2013.01)

(58) Field of Classification Search
CPC ........... H04N 5/23293; H04N 5/23245; H04N 5/232; H04N 5/232933; H04N 5/232935; H04N 5/232939; H04N 5/232945; H04N 5/23299; H04N 5/23296
USPC .................................................. 348/333.11
See application file for complete search history.

(56) References Cited

U.S. PATENT DOCUMENTS

| | | | | |
|---|---|---|---|---|
| 7,834,928 B2* | 11/2010 | Misawa | ............... | H04N 5/2253 348/335 |
| 7,839,435 B2* | 11/2010 | Sato | ................... | H04N 5/23212 348/222.1 |
| 10,158,806 B2* | 12/2018 | Salimpour | ......... | H04N 5/23293 |
| 10,284,800 B2* | 5/2019 | Ise | ...................... | H04N 5/23245 |
| 2003/0218687 A1* | 11/2003 | Sato | .................... | H04N 5/23212 348/362 |
| 2009/0268075 A1* | 10/2009 | Yumiki | .................. | G03B 7/095 348/333.05 |
| 2015/0172532 A1* | 6/2015 | Izawa | ................ | H04N 5/23212 348/333.11 |
| 2016/0373722 A1* | 12/2016 | Mishra | ................... | G06T 1/0028 |
| 2017/0064208 A1* | 3/2017 | Salimpour | ......... | H04N 5/23293 |
| 2017/0125064 A1* | 5/2017 | Aggarwal | .......... | G06K 9/00744 |
| 2018/0115729 A1* | 4/2018 | Ise | ...................... | H04N 5/23245 |
| 2019/0109981 A1* | 4/2019 | Zhang | .............. | H04N 5/232935 |

FOREIGN PATENT DOCUMENTS

JP 2015-144346 A 8/2015

* cited by examiner

*Primary Examiner* — Pritham D Prabhakher
(74) *Attorney, Agent, or Firm* — Venable LLP

(57) ABSTRACT

An image capturing apparatus is provided with: an image capture element; a readout unit configured to readout, from the image capture element, a first image corresponding to a portion of a first number of pixels and a second image corresponding to a portion of a second number of pixels that is smaller than the first number of pixels, a display unit configured to display by switching between the first image and the second image; and an adjustment unit configured to, if a display area of the first image in the display unit differs to a display area of the second image in the display unit, adjust one of the first image and the second image so that the display area of the first image matches the display area of the second image.

12 Claims, 6 Drawing Sheets

IMAGE CAPTURING APPARATUS, METHOD OF CONTROLLING SAME, AND STORAGE MEDIUM

BACKGROUND OF THE INVENTION

Field of the Invention

The present invention relates to an image capturing apparatus for performing a live view display.

Description of the Related Art

There are image capturing apparatuses, such as a digital camera, that are provided with a continuous shooting (continuous capturing) function for performing continuous capturing of still images while performing automatic focus detection of an image capture surface phase difference detection method (image plane phase difference AF) with respect to a primary object. During execution of this continuous shooting function, the image capturing apparatus reads out each of an image to be displayed as a live view (LV) image on a backside monitor or the like, and a recording image to record as a still image, and performs display and recording in real-time.

For example, a technique for improving trackability with respect to a primary object when causing a display apparatus to display an image obtained from an image capture element as a live view image (an LV image) while performing focus detection at a time of continuous shooting is known. Japanese Patent Laid-Open No. 2015-144346 proposes a technique for switching whether to consecutively display images of different resolutions or display only high-resolution images, on a display apparatus. By virtue of Japanese Patent Laid-Open No. 2015-144346, it is possible to improve trackability with respect to a primary object when shortening and framing a display time interval of an LV image, even in continuous shooting with a low frame rate.

However, with the technique proposed by Japanese Patent Laid-Open No. 2015-144346, when consecutively displaying images with different resolutions on a display apparatus, there are cases where differences in angles of view between images occur in accordance with, for example differences in exposure or differences in signal readout conditions between images with different resolutions. When there are differences in angles of view between displayed images in this way, there is an unnatural display with a sense of unnaturalness for a user because images with different angles of view are alternatingly displayed.

SUMMARY OF THE INVENTION

The present invention is made in light of the problem described above, and reduces a sense of unnaturalness for images consecutively displayed when obtaining images of different types and displaying these images at a time of continuous capturing.

According to a first aspect of the present invention, there is provided an image capture apparatus comprising: an image capture element configured to capture an object image; and at least one processor or circuit configured to function as the following units: a readout unit configured to readout, from the image capture element, a first image corresponding to a portion of a first number of pixels and a second image corresponding to a portion of a second number of pixels that is smaller than the first number of pixels, from out of pixel areas of the image capture element; a display unit configured to display by switching between the first image and the second image; and an adjustment unit configured to, if a display area of the first image in the display unit differs to a display area of the second image in the display unit, adjust one of the first image and the second image so that the display area of the first image matches the display area of the second image.

According to a second aspect of the present invention, there is provided a method of controlling an image capturing apparatus having an image capture element operable to capture an object image, the method comprising: reading out, from the image capture element, a first image corresponding to a pixel area of a first number of pixels and a second image corresponding to a pixel area of a second number of pixels that is smaller than the first number of pixels, from out of pixel areas of the image capture element; displaying, on a display unit, by switching between the first image and the second image; and if a display area of the first image in the display unit differs to a display area of the second image in the display unit, adjusting one of the first image and the second image so that the display area of the first image matches the display area of the second image.

Further features of the present invention will become apparent from the following description of exemplary embodiments with reference to the attached drawings.

DESCRIPTION OF THE EMBODIMENTS

Hereinafter, referring to the attached drawings, embodiments of the present invention will be described in detail. In each embodiment below, description is given regarding an image capturing apparatus, provided with an image capture element having divided-pupil focus detection pixels, that performs continuous capturing (AF continuous shooting) while focusing on an object. In continuous capturing, by performing image processing control so that a difference in angle of view between a display image for a still image and a display image for live view (LV) gets small, it is possible to suppress a decrease in trackability during framing while maintaining display quality.

First Embodiment

Figure 1:
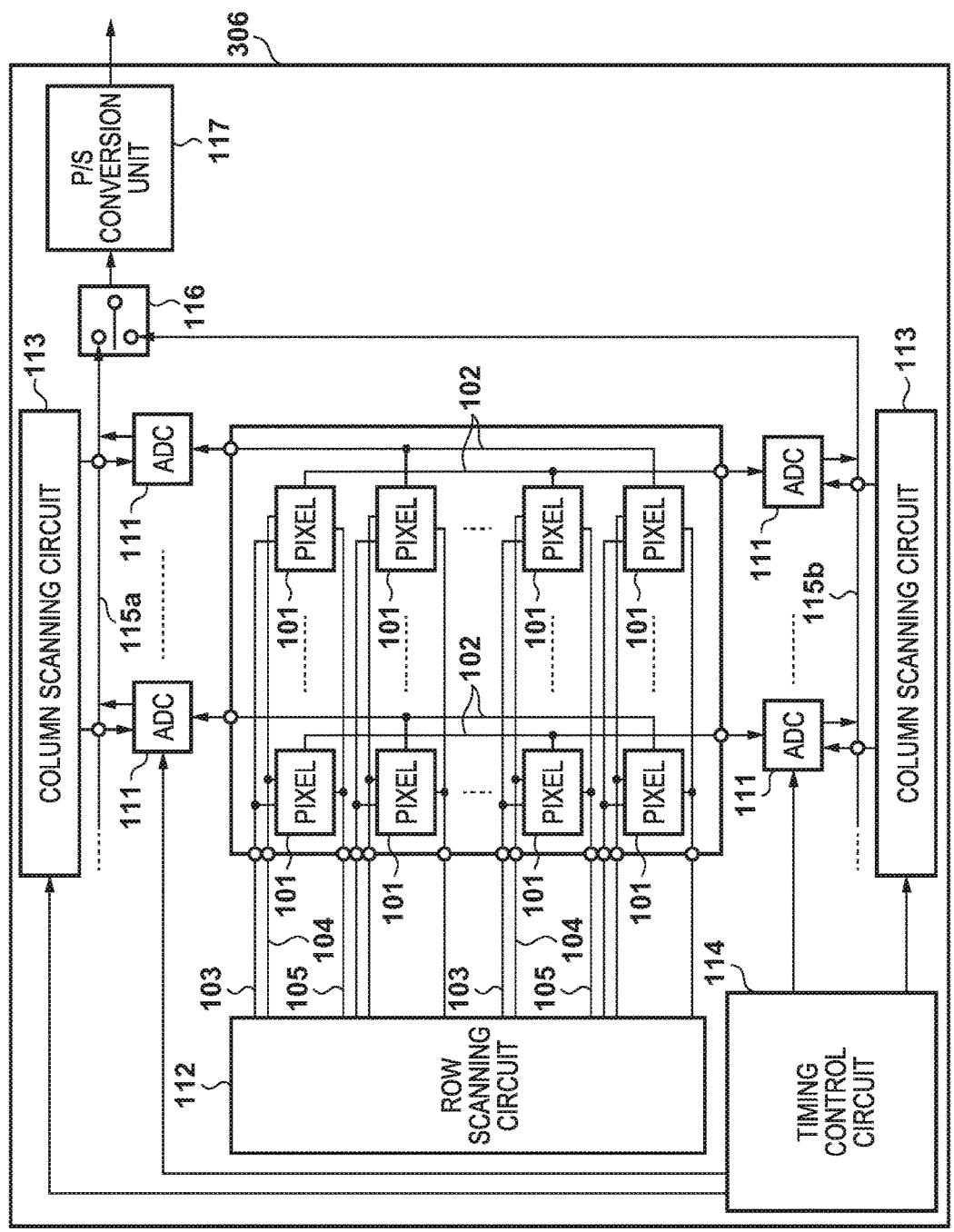
FIG. 1 is an overview structural view of an image capture element in a first embodiment of the present invention.

FIG. 1 is an overview block diagram illustrating an example of a configuration of an image capture element in a first embodiment of the present invention. In FIG. 1, an image capture element 306 has a configuration in which a plurality of unit pixels 101 are arranged in a two-dimensional array. With respect to each unit pixel 101, a vertical output line 102, a transfer signal line 103, a reset signal line 104, and a row selection signal line 105 are respectively connected. A column ADC block 111 performs an A/D conversion (analog to digital conversion) on a signal outputted from a vertical output line 102 connected to unit pixels 101, and outputs a result of the A/D conversion. A row scanning circuit 112 is connected to unit pixels 101 via a transfer signal line 103, a reset signal line 104, and a row selection signal line 105. A plurality of column scanning circuits 113 are connected to a plurality of column ADC blocks 111 via horizontal signal lines 115a and 115b. A timing control circuit 114 outputs and controls a timing control signal to each column ADC block 111 and each column scanning circuit 113.

A switching unit 116 switches between respective signals from the horizontal signal lines 115a and 115b, and outputs to a parallel/serial conversion unit (hereinafter referred to as a P/S conversion unit) 117. The P/S conversion unit 117 obtains the output of the switching unit 116, and performs a parallel to serial conversion. The P/S conversion unit 117 outputs a converted signal to an external unit.

With the image capture element 306 of the present embodiment, the plurality of unit pixels 101 are connected to transfer signal lines 103, reset signal lines 104 and row selection signal lines 105 in a horizontal direction (a row direction), and are connected to vertical output lines 102 in a vertical direction (a column direction). Connection destinations differ in readout row units for each vertical output line 102. Signals read out from the unit pixels 101 are outputted, via the column ADC blocks 111, from the horizontal signal line 115a and the horizontal signal line 115b for each channel, and sent to the switching unit 116. An image signal selected at the switching unit 116 is subject to a parallel/serial conversion by the P/S conversion unit 117 in alignment with a timing of the timing control circuit 114, and outputted to a unit external to the image capture element 306.

A method of reading out pixel signals can be appropriately selected from a method of reading out all pixels, a method of reading out after thinning pixels in the vertical direction, a method of adding pixels in the horizontal direction and then reading out, a vertical thinning horizontal addition method, or the like. The vertical thinning horizontal addition method is a method for performing thinned readout in the vertical direction and performing a read out after adding pixels in the horizontal direction.

In the present embodiment, a method for reading out all pixels (a first read out mode) is employed for read out of a still image. In the first read out mode, pixel signals are read out from an entire pixel area of the image capture element as a pixel area of a first number of pixels. Because the number of readout pixels is large, only a limited number of images can be obtained in predetermined amount of time, and thus, when an object that is a moving body is moving at high speed, it is difficult to correctly capture the object within the angle of view. In contrast, the vertical thinning horizontal addition method (a second read out mode) is employed for a live view readout method. In the second read out mode, pixel signals are read out from a pixel area (a portion) having a second number of pixels lower than the first number of pixels. Because the number of readout pixels is low, it is suitable for increasing the speed of processing. However, there are cases where pixels necessary for image processing are insufficient due to a thinning ratio. In such a case, a difference occurs in image capturing regions (display areas) between a live view image and a still image.

Figure 2:
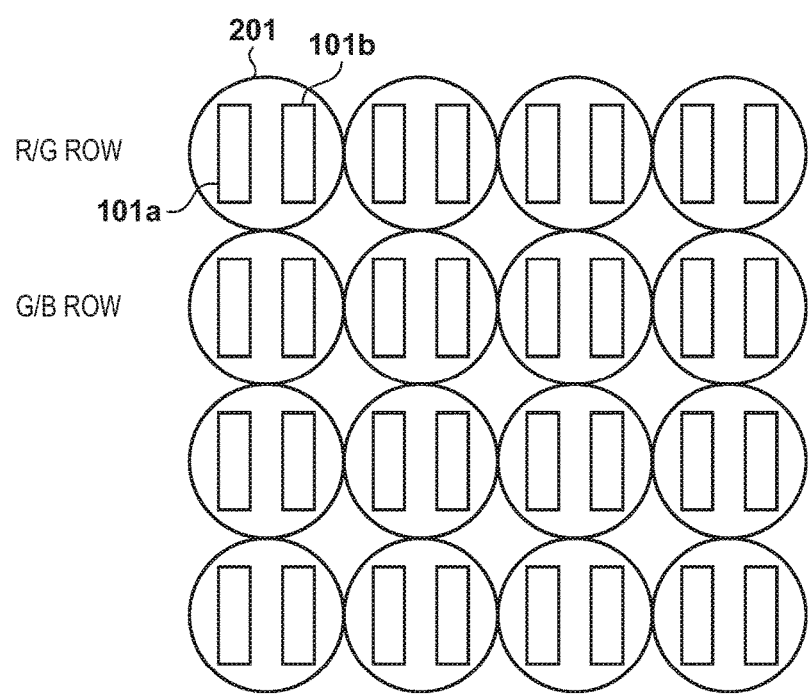
FIG. 2 is a pixel array view of an image capture element in the first embodiment.

FIG. 2 is a view that schematically illustrates a pixel array of the image capture element 306 which is used in image plane phase difference AF in the present embodiment. The image capture element 306 has a configuration that has a plurality of unit pixels in which a plurality of photoelectric conversion units are arranged, in correspondence with one on-chip microlens 201. A Bayer array is applied to color filters, and, to pixels in odd numbered rows indicated by "R/G row", red and green color filters are alternatingly provided in this order from the left. In addition, to pixels in even numbered rows indicated by "GB row", green and blue color filters are alternatingly provided in this order from the left. On-chip microlenses 201 are configured on the color filters. A plurality of photoelectric conversion units provided inside an on-chip microlens 201 are indicated by a plurality of rectangles.

In a divided-pupil type image capture element, photoelectric conversion units that form a pair arranged with respect to one microlens 201 are respectively denoted by an A pixel 101a, and a B pixel 101b. An A image which is a first viewpoint image is generated in accordance with output from A pixels 101a included in a first pixel group. A B image which is a second viewpoint image is generated in accordance with output from B pixels 101b included in a second pixel group. A calculation unit detects a relative image shift amount between the A image and the B image by a correlation calculation, and calculates a defocus amount for a predetermined focus detection region. A focus lens is moved based on the defocus amount, and a focus adjustment operation of a lens unit 301 (refer to FIG. 3) is performed. In addition, a signal of the A image and a signal of the B image are added inside the image capture element, and an image signal for display and for recording is generated. Note that there may be an aspect where a portion of a light-receiving surface of a photoelectric conversion unit is blocked without having a pixel configuration where a plurality of photoelectric conversion units are provided for one unit pixel as illustrated in FIG. 2.

Figure 3:
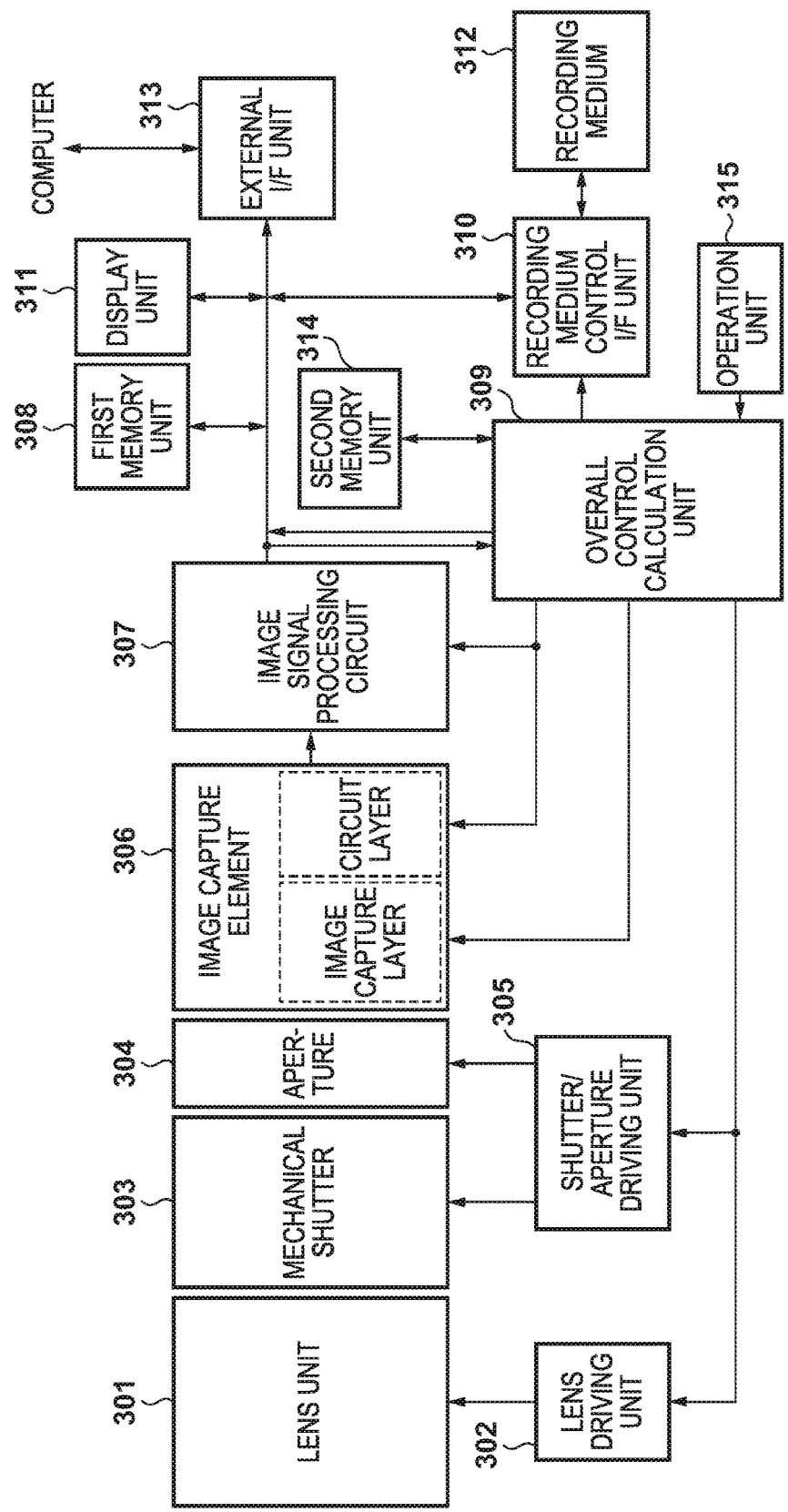
FIG. 3 is a block diagram indicating an overview configuration of an image capturing apparatus in the first embodiment.

FIG. 3 is a block diagram illustrating an overview configuration of an image capturing apparatus 300 that uses the image capture element 306. The image capturing apparatus 300 of the present embodiment is, as an example, a digital camera that can obtain a moving image or a still image, but there is no limitation to this. For example, the present invention can also be applied to a monitoring camera, a handheld device such as a smart phone, or a moving body such as an in-vehicle camera.

The lens unit 301 is provided with a plurality of lenses that configure an image capturing optical system. The lens unit 301 is an interchangeable lens that can be attached to a camera main body unit, or a lens unit integrated with the camera main body unit. A lens driving unit 302 drives a movable lenses that configure the image capturing optical system (a zoom lens, a focus lens, or the like). A mechanical shutter 303 is used for control of an exposure time, and an aperture 304 is used for control of an amount of light. A mechanical shutter/aperture driving unit (denoted as a shutter/aperture driving unit in the FIG. 305 controls an exposure state of the image capture element 306 by driving the mechanical shutter 303 and the aperture 304. Note that there may be a configuration that provides an optical filter, such as an ND filter, as a means for controlling an exposure amount.

The image capture element 306 receives light from an object whose image is formed through the image capturing optical system, performs a photoelectrical conversion, and outputs an electrical signal. In the case of an image capture element having a stacked configuration, it has an image capture layer and a circuit layer. An image signal processing circuit 307 processes an output signal of the image capture element 306, and outputs an image signal after the processing. A first memory unit 308 stores, for example, an image signal processed by the image signal processing circuit 307.

An overall control calculation unit 309 is a central unit responsible for control of the entirety of the image capturing apparatus 300, and is provided with a CPU (central processing unit). The CPU executes a program read out from a second memory unit 314 to control operation of each unit. The second memory unit 314 stores, for example, camera information set in the image capturing apparatus in accordance with a calculation result of the CPU or a user operation.

A recording medium control interface (I/F) unit 310, in accordance with a control instruction by the overall control calculation unit 309, records an image signal or the like in a recording medium 312, or performs processing to read out information from the recording medium 312. The recording medium 312 can be attached to and detached from a main body portion of the image capturing apparatus. A display unit 311 is provided with a display device such as a liquid crystal display panel, and displays a screen such as image data, in accordance with a control instruction by the overall control calculation unit 309.

An external interface (I/F) unit 313 is a communication processing unit is for sending and receiving information to and from an external apparatus such as a computer. In the present embodiment, the image capturing apparatus 300 is provided with the display unit 311, but image information or related information is outputted to a display apparatus of an external unit via an external I/F unit 313 in a case of an image capturing apparatus that does not have display means. For example, processing for outputting only a live view image and processing for alternatingly outputting a still image and a live view image at a time of AF continuous shooting are executed.

An operation unit 315 is provided with an input device such as a switch or a touch panel, and inputs an operation instruction signal to the overall control calculation unit 309 after accepting an operation instruction from a user. The overall control calculation unit 309 controls the entirety of the image capturing apparatus 300 based on information relating to an image capturing mode, exposure settings or the like of the image capturing apparatus which are set by a user in accordance with the operation unit 315.

Light from an object that has passed through the lens unit 301 is adjusted to an appropriate amount of light by the aperture 304, and forms an image on the image capture surface of the image capture element 306. The photoelectric conversion units that configure a unit pixel 101 of the image capture element 306 perform photoelectrical conversions on an object image and output electrical signals. Gain control is further performed on the electrical signals, and, after the electrical signals are converted to digital signals from analog signals by A/D conversion, signals for R (red), Gr (green), Gb (green), and B (blue) are sent to the image signal processing circuit 307.

The image signal processing circuit 307 performs predetermined calculation processing using the image data that has been converted to a digital signal. The overall control calculation unit 309 performs exposure control and focus adjustment control based on an obtained calculation result. By this, TTL (through the lens) AE (automatic exposure) processing, and EF (flash automatic light control emission) processing are performed. In addition, the image signal processing circuit 307 performs predetermined calculation processing using captured image data, and performs TTL AWB (automatic white balancing) processing based on an obtained calculation result. In addition, the image signal processing circuit 307 performs various signal processing such as low-pass filter processing for reducing noise, shading correction processing, and white balance processing, and also performs various corrections, compression of an image signal, or the like.

During capturing, control of zoom driving, focus driving, or the like by the lens driving unit 302 is performed for the lens unit 301. The mechanical shutter 303 and the aperture 304 are each driven by the mechanical shutter/aperture driving unit 305 in accordance with a control instruction from the overall control calculation unit 309. The first memory unit 308 temporarily stores an image signal after capturing. The recording medium control I/F unit 310 performs processing for recording an image signal to the recording medium 312, and processing for reading out a signal from the recording medium 312. The display unit 311 displays a captured image on a screen.

Figure 4:
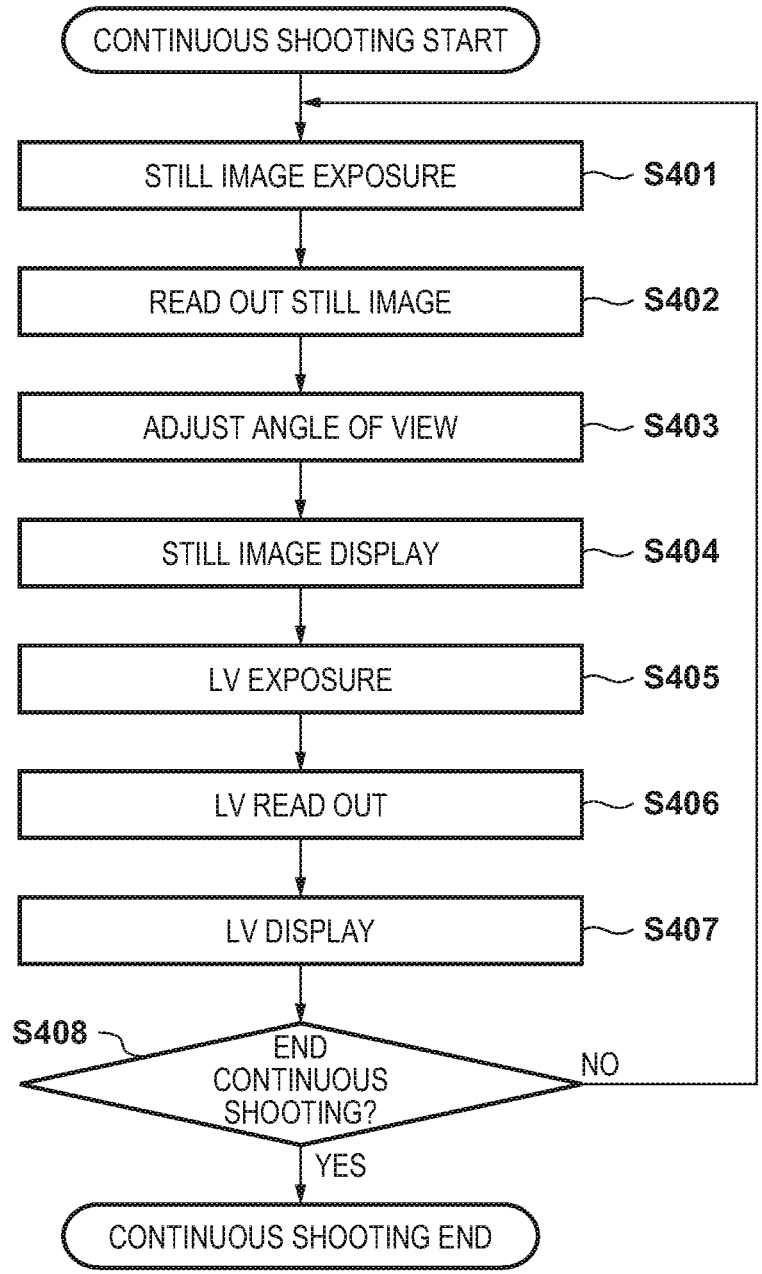
FIG. 4 is a flowchart indicating a continuous shooting operation in the first embodiment.

Next, with reference to FIG. 4, description is given regarding processing at a time of continuous shooting in the present embodiment. FIG. 4 is a flowchart for describing a continuous shooting operation in an image capturing apparatus of the present embodiment.

When continuous shooting is started in the image capturing apparatus 300, in step S401, exposure of the image capture element 306 for still image capturing is performed. After the end of exposure, in step S402, an image signal of a still image is read out from the image capture element 306. In step S403, the overall control calculation unit 309 controls the image signal processing circuit 307 to adjust an angle of view for a still image for display. In other words, the angle of view is adjusted by performing cropping (cutting out) with respect to the still image so that an image capturing region (a display area) matches with that of the live view image. In step S404, the still image adjusted in step S403 is displayed on a screen of the display unit 311.

In step S405, the overall control calculation unit 309 performs exposure of the image capture element 306 for live view shooting. In step S406, a signal for a live view image is read out from the image capture element 306. In step S407, a live view image is displayed on the screen of the display unit 311.

In step S408, the overall control calculation unit 309 determines whether a user has made an instruction for ending continuous shooting by the operation unit 315. If continuation of continuous shooting is determined in step S408, the processing returns to step S401. If ending continuous shooting is determined in step S408, this series of processing ends.

Although whether to end continuous shooting is determined after the live view display in step S407 in the present embodiment, the determination may be performed after the still image display of step S404. However, it is desirable to perform the determination after the live view display (step S407) because it is possible to reduce time lag until subsequent capturing.

Figure 5:
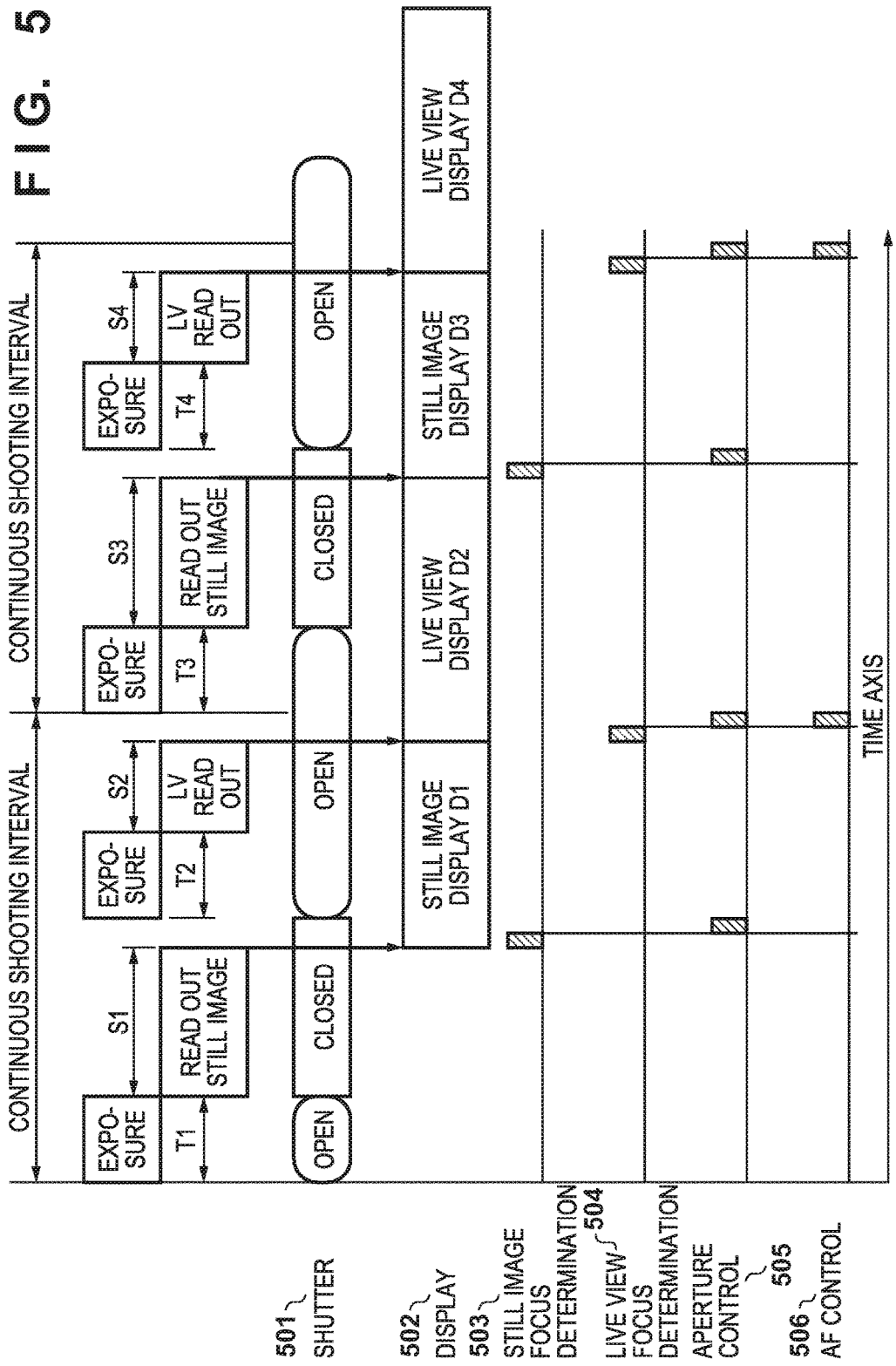
FIG. 5 is a timing chart for alternating display in the first embodiment.

FIG. 5 is a timing chart for a case of alternatingly performing a still image display and a live view display. Time periods T1 to T4 each indicate an exposure time period. Time periods S1 and S3 each indicate a still image readout time period of step S402 of FIG. 4, and time periods S2 and S4 each indicate a live view readout time period of step S406 of FIG. 4. A shutter opened/closed state (reference numeral 501) is indicated in the timing chart. Display time periods (reference numeral 502) indicate that the still image (a first image) display of step S404 of FIG. 4 and the live view image (a second image) display of step S407 of FIG. 4 are alternatingly performed. Time periods D1 and D3 are display time periods for still images of step S404 of FIG. 4, and time periods D2 and D4 are display time periods for live view images of step S407 of FIG. 4. Timings for focus determinations (reference numerals 503 and 504), aperture control (reference numeral 505), and AF control (reference numeral 506) are respectively indicated by filled rectangular symbols. Timings of focus determination (reference numeral 503) for still images and focus determination (reference numeral 504) for live views are after the end of respective readout time periods S1 to S4. Aperture control (reference numeral 505) is performed after focus determination (reference numeral 503) for a still image, and aperture control (reference numeral 505) and AF control (reference numeral 506) are performed after focus determination (reference numeral 504) for a live view.

In the present embodiment, in relation to display of a still image, control for adjusting an angle of view of the still image is performed so that an image capturing region matches that of a live view image. By this, it is possible to achieve both of maintaining display quality and trackability during framing, even if an image capturing region of a live view image is smaller than that of a still image.

Note that, although control for cropping a still image was described as adjustment of an angle of view in the first embodiment, a method of copying pixels to increase a number of pixels at peripheral portions of a live view image or a method of overwriting a still image may be used as a method of adjusting an angle of view.

In addition, although control for adjusting an angle of view by the image signal processing circuit 307 was described, the overall control calculation unit 309 may perform display control so that the same image capturing region is displayed when displaying images on the display unit 311.

Second Embodiment

Next, a second embodiment of the present invention is described. In the present embodiment, description is given regarding a method of switching angle of view adjustment processing (the processing of step S403) in accordance with a threshold value. Note that, in the present embodiment, reference numerals already used are used for constituent elements that are similar to those in the first embodiment, and thus detailed description thereof is omitted, and primarily differences are described. In addition, although description is given in the present embodiment regarding a vertical direction of an image for which a difference in angle of view often occurs, there is no limitation to control in only the vertical direction.

In the first embodiment, angle of view adjustment (step S403) is always being executed. Accordingly, even if angle of view adjustment is unnecessary, excessive time is taken to display a still image. Accordingly, in the second embodiment, excessive angle of view adjustment is reduced by determining whether a difference in angle of view between a still image and a live view image exceeds a threshold value.

Figure 6:
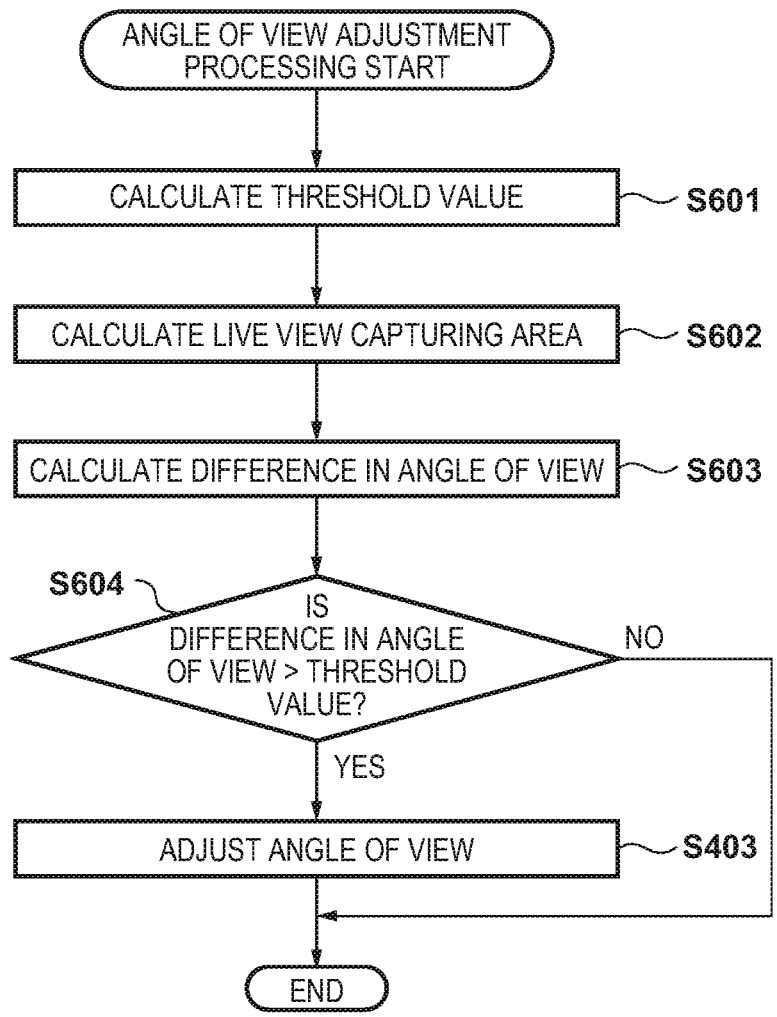
FIG. 6 is a flowchart indicating operation for angle of view adjustment processing in a second embodiment.

FIG. 6 is a flowchart indicating angle of view adjustment operation in the second embodiment.

Firstly, a threshold value is calculated in step S601. For example, if a number of readout pixels for a still image is 4480 pixels, 4480×0.1%=4 pixels is set as the threshold value. In step S602, a live view capturing area is calculated. For example, when a number of readout pixels for a live view is 894 pixels and the thinning ratio is 1/5, a capturing area of the live view is 894×5=4470 pixels.

In step S603, a difference in angle of view between the capturing area for a still image and a capturing area for a live view is calculated. Because the capturing area for a still image is the same as the number of readout pixels for a still image, in the example described above the difference in the angle of view is 4480−4470=10 pixels. In step S604, a determination of whether the difference in angle of view is greater than the threshold value is performed, and if the difference in angle of view is greater than the threshold value, the processing proceeds to step S403, and an angle of view adjustment is performed. If the difference in angle of view is less than or equal to the threshold value, the processing ends without adjustment of the angle of view being performed. For example, in the example described above, because the difference in angle of view (10 pixels) exceeds the threshold value (4 pixels), the processing proceeds to step S403, and an adjustment of the angle of view is performed.

Note that, in the calculation of the threshold value, 0.1% of the number of pixels was taken as the threshold value, but there is no limitation to this numerical value, and any numerical value may be used to calculate the threshold value. In addition, the threshold value can also be calculated from the number of pixels for a still image display image and a live view display image. This is because it is possible to ignore a difference in the angle of view that is less than one pixel by the number of pixels for the still image display image and the live view display image. For example, if the number of pixels of the still image display image and live view display image is 1080 pixels, the threshold value corresponding to one pixel of the display image is 4480±1080=4.148 . . . pixels, and rounding down below the decimal point, the threshold value can be finally calculated as 4 pixels. Because the smaller the number of pixels for the still image display image and the live view display image, the more likely it is for adjustment of an angle of view to be unnecessary, it is desirable to use the number of pixels for the still image display image and the live view display image to calculate the threshold value.

By virtue of the second embodiment, it is possible to achieve both of display quality preservation and capturing performance by omitting excessive control if there is little difference in angle of view.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-116381, filed Jun. 19, 2018, which is hereby incorporated by reference herein in its entirety.

What is claimed is:

1. An image capture apparatus comprising:
an image capture element configured to capture an object image; and
at least one processor or circuit configured to function as the following units;
a readout unit configured to readout, from the image capture element, a first image corresponding to a portion of a first number of pixels and a second image corresponding to a portion of a second number of pixels that is smaller than the first number of pixels, from out of pixel areas of the image capture element;
a display unit configured to display by switching between the first image and the second image; and
an adjustment unit configured to, if a display area of the first image in the display unit differs to a display area of the second image in the display unit, adjust one of the first image and the second image so that the display area of the first image matches the display area of the second image.

2. The image capturing apparatus according to claim 1, wherein the adjustment unit adjusts the first image to cause the display area of the first image to match the display area of the second image.

3. The image capturing apparatus according to claim 2, wherein the adjustment unit cuts out, from the first image, a region corresponding to the display area of the second image to cause the display area of the first image to match the display area of the second image.

4. The image capturing apparatus according to claim 1, wherein the adjustment unit adjusts the second image to cause the display area of the first image to match the display area of the second image.

5. The image capturing apparatus according to claim 4, wherein the adjustment unit copies and increases pixels of a peripheral portion of the second image to cause the display area of the first image to match the display area of the second image.

6. The image capturing apparatus according to claim 1, wherein the first image is a still image and the second image is a live view image.

7. The image capturing apparatus according to claim 1, wherein the display unit alternatingly displays the first image and the second image.

8. The image capturing apparatus according to claim 1, wherein the adjustment unit performs the adjustment if a difference in angle of view between the first image and the second image is greater than a predetermined threshold value.

9. The image capturing apparatus according to claim 8, wherein the predetermined threshold value is calculated using a number of pixels of the first image and a number of pixels of the second image.

10. The image capturing apparatus according to claim 1, wherein the display unit displays by switching between the first image and the second image which are obtained by continuous capturing.

11. A method of controlling an image capturing apparatus having an image capture element operable to capture an object image, the method comprising:
reading out, from the image capture element, a first image corresponding to a pixel area of a first number of pixels and a second image corresponding to a pixel area of a second number of pixels that is smaller than the first number of pixels, from out of pixel areas of the image capture element;
displaying, on a display unit, by switching between the first image and the second image; and
if a display area of the first image in the display unit differs to a display area of the second image in the display unit, adjusting one of the first image and the second image so that the display area of the first image matches the display area of the second image.

12. A non-transitory computer-readable storage medium storing a program for causing a computer to function as each unit of an image capturing apparatus provided with:
an image capture element configured to capture an object image;
a readout unit configured to readout, from the image capture element, a first image corresponding to a portion of a first number of pixels and a second image corresponding to a portion of a second number of pixels that is smaller than the first number of pixels, from out of pixel areas of the image capture element;
a display unit configured to display by switching between the first image and the second image; and
an adjustment unit configured to, if a display area of the first image in the display unit differs to a display area of the second image in the display unit, adjust one of the first image and the second image so that the display area of the first image matches the display area of the second image.

* * * * *